Nov. 12, 1968  G. L. RODGERS  3,410,486

CONTROL SYSTEM FOR HEATING AND COOLING APPARATUS

Filed Nov. 10, 1965  4 Sheets-Sheet 1

INVENTOR
GERALD L. RODGERS

BY
ATTORNEY

Nov. 12, 1968     G. L. RODGERS     3,410,486
CONTROL SYSTEM FOR HEATING AND COOLING APPARATUS
Filed Nov. 10, 1965     4 Sheets-Sheet 2

INVENTOR
GERALD L. RODGERS

BY
ATTORNEY

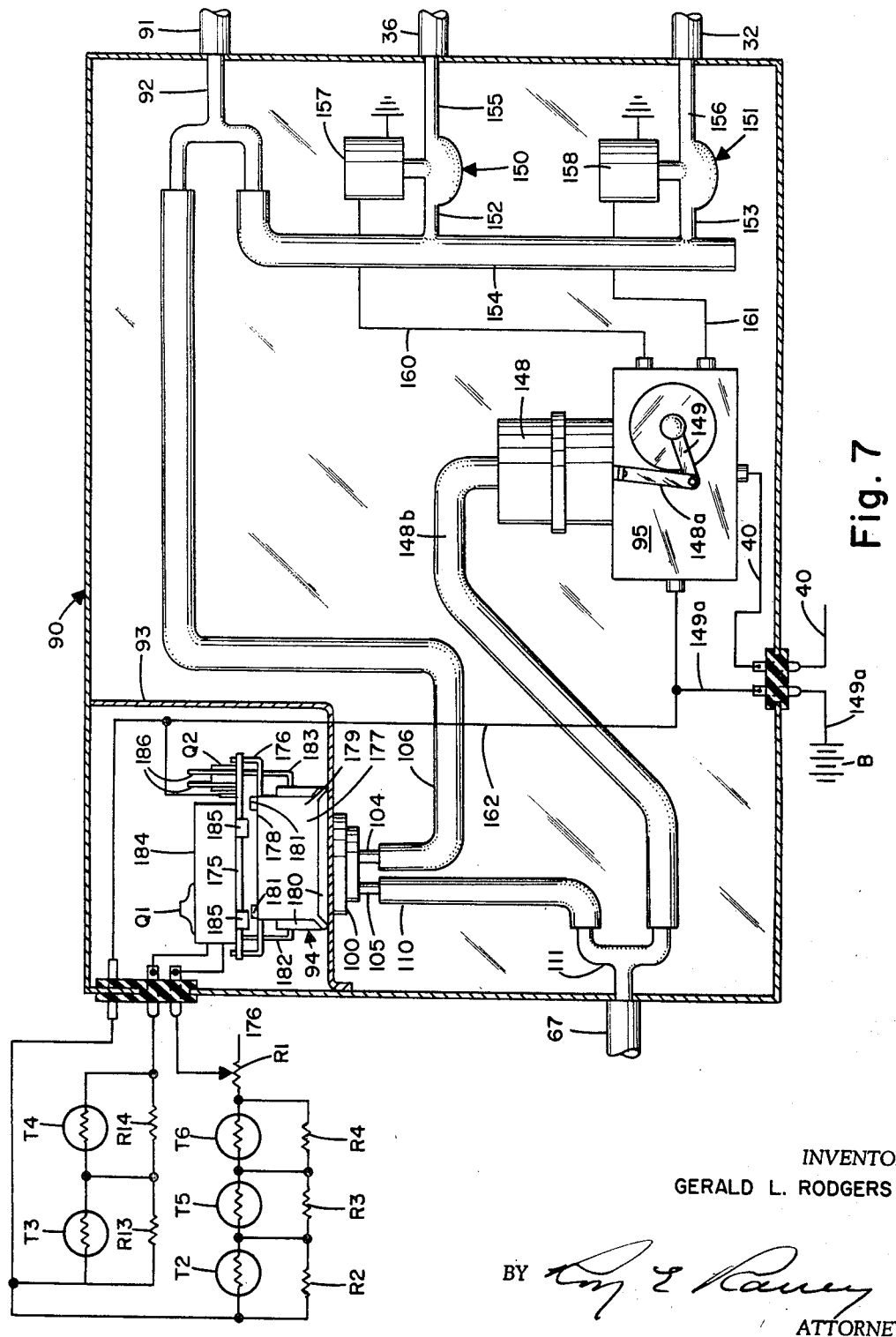

United States Patent Office 3,410,486
Patented Nov. 12, 1968

3,410,486
CONTROL SYSTEM FOR HEATING AND
COOLING APPARATUS
Gerald Loyd Rodgers, Worthington, Ohio, assignor to
Ranco Incorporated, Columbus, Ohio, a corporation of
Ohio
Filed Nov. 10, 1965, Ser. No. 507,133
9 Claims. (Cl. 236—68)

ABSTRACT OF THE DISCLOSURE

A system for controlling the air temperature in a space into which tempered air is discharged from air tempering means. The system includes control means regulating the temperature of air discharged from the tempering means having a thermally responsive element which is operable to govern the amount of heat transfer between tempering means in the air and circuitry for controlling the thermally responsive element in response to sensed air temperature in the air space. The control circuitry includes first and second signal circuits which produce signals in response to sensed air temperatures and means permitting only one of the circuits to control operation of the control circuitry.

The present invention relates to a temperature control system particularly suited for automotive vehicle passenger compartments to automatically provide comfortable selectable temperatures.

It has been proposed heretofore to control the temperature inside the passenger compartment of an automobile and the like by providing a heating unit for discharging heated air into the compartment to maintain a selected temperature therein, the heat furnished by the heating unit being automatically controlled by a system including an electrically heated thermally responsive element operable to regulate the temperature of the air discharged from the heating unit into the compartment in accordance with the degree of heating of the thermally responsive element, the current for the heating circuit of the thermally responsive element being controlled by temperature sensitive means responsive to the air temperature inside the compartment and to the temperature of the air discharging from the heating unit into the compartment. In such systems, when the temperature selection control is reset from a higher to a lower temperature the flow of current in the heating circuit of the thermally responsive element is altered to result in a reduction or shut down of the heat input of the heating unit, and consequently cool air is discharged into the compartment to the discomfort of the passengers.

A principal object of the present invention is the provision of an improved temperature control system of the character mentioned which prevents the discharge of air into the passenger compartment of a vehicle or the like at a temperature which will be uncomfortable to the occupants of the compartment in the event that the control system is reset to provide for the maintenance of a lower temperature in the compartment.

A more specific object of this invention is the provision of an improved control system for an automobile passenger compartment tempering system of the foregoing character comprising electrical amplifier means the output current of which is utilized to regulate the passenger compartment heating unit in response to an automatically selected one of a plurality of input signals including a first signal representing a function of a desired temperature and the actual temperature in the compartment and a second signal representing a function of the outside air temperature and the temperature of the air being introduced into the compartment from the heater, the second signal being operative to automatically take over control of the amplifier means from the first signal when a predetermined relation exists between the signals which is indicative of conditions which would lead to passenger discomfort.

A still more specific object of the invention is the provision of an improved control circuit of the character set forth in the preceding paragraph in which the first and second signals are derived from first and second voltage divider circuits including temperature sensitive resistors responsive to different temperature conditions, and means such as a rectifier diode for isolating the first voltage divider circuit from the amplifier except when the signal voltage thereof exceeds the signal voltage of the second divider circuit, in which case the signal voltage provided by the first divider circuit takes over control of the amplifier means to provide an output thereof proportional to the signal voltage.

Another object of the invention is the provision of a control system for regulating the temperature in a passenger compartment of a vehicle or the like comprising a heating unit for discharging heated air into the compartment, the temperature of the air discharged being controlled by an electrically responsive device including a thermally responsive actuating element and an electric heating circuit for the element, the electric current for the heater circuit being regulated by a current amplifier connected to a junction in a voltage divider circuit between a resistance responsive to the temperature of the air in the compartment and a resistance responsive to the temperature of the thermally responsive actuating element whereby the current supplied to the heater circuit will be such as to maintain the temperature of the thermally responsive element at a degree proportional to the heat input requirements of the system.

Other objects and advantages of compartment tempering systems and control circuits embodying this invention will become apparent from the following detailed description of presently preferred examples thereof, read in conjunction with the accompanying sheets of drawings forming a part of this specification, and in which:

FIG. 7 is a schematic illustration of a housing for components of the control system for the air tempering apparatus.

Figure 1:
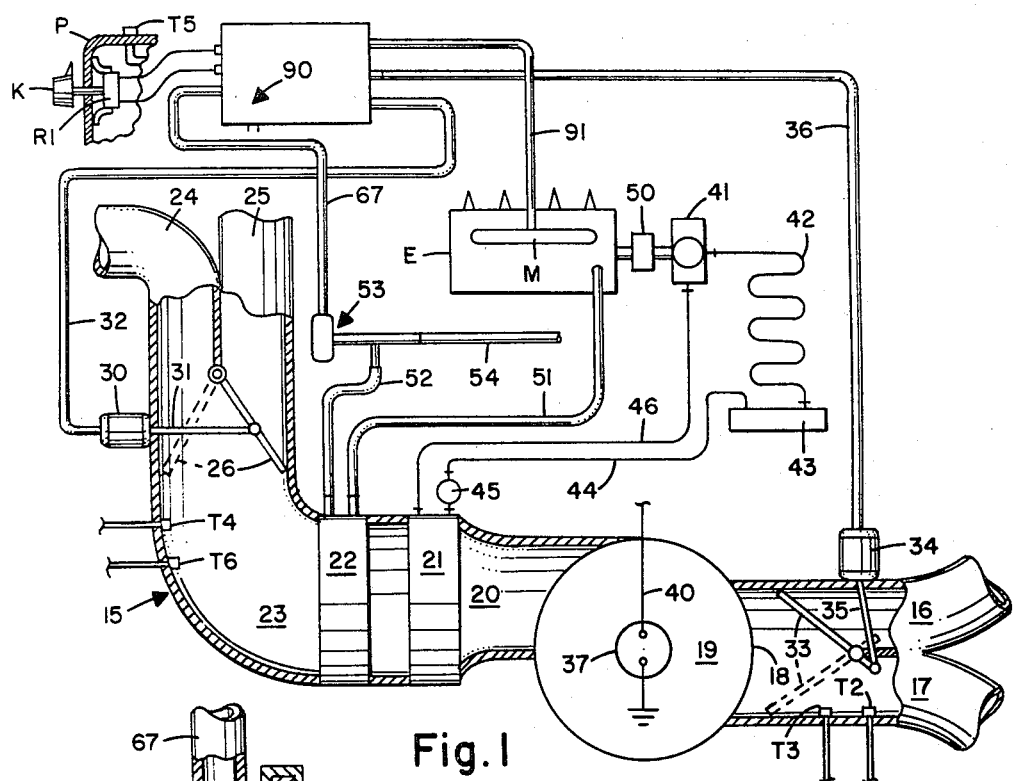
FIG. 1 is a schematic drawing of a part of the passenger compartment of an automobile and a system for tempering air in the compartment to maintain a selectable desired average temperature of the air.

Referring to the drawings, there is illustrated an automotive passenger compartment tempering system embodying the present invention. Briefly, the system comprises heating and cooling units arranged to successively temper air from either the exterior or interior of the automobile and direct it into the compartment through discharge ducts, the air being moved by a suitable fan or blower, or by forward motion of the automobile. A temperature selecting control means including a control knob K is accessible to the operator of the automobile and which may be adjusted to select a desired temperature to be maintained within the passenger compartment. For this purpose the knob may cooperate with an appropriately calibrated dial to facilitate selection of a desired temperature.

More specifically, referring to FIG. 1 of the drawings a comfort control system for passenger compartments of an automobile is shown schematically and it comprises an air duct system 15 having two air inlet branches 16, 17 which lead to an inlet 18 of an electric motor driven blower 19 which discharges air into a duct section 20 leading to the inlet of an air cooling unit 21 which extends transversely of the duct section and is adapted to chill air passing therethrough. Air discharging from the cooling unit directly enters a heating unit 22, and the air discharged from this unit is directed through duct section 23 and is discharged into the passanger compartment through either one of two outlet branches 24 or 25, according to the position of a damper 26. Branch 24 leads to suitable hot air outlets (not shown) preferably in the lower part of the passenger compartment, and branch 25 leads to suitable cool air discharge outlets (not shown) preferably in a higher part of the compartment. Damper 26 is pivoted in the duct and swingable by a vacuum motor 30 connected to the damper by a rod 31. Vacuum motor 30 is of well known conventional construction, having a rigid shell and a flexible diaphragm (not shown) extending transversely thereof and having rod 31 connected thereto. The diaphragm is urged to move damper 26 to the position shown in full lines when the pressure on opposite sides of the diaphragm are equal, and when a vacuum is created on one side, the diaphragm operates to shift the damper 26 to the position shown by the dotted lines to direct air through the discharge duct 25. The pressure in motor 30 is supplied through a tube 32 interconnecting the interior of the motor with a source of vacuum described hereinafter.

Inlet 16 is open to the interior of the automobile compartment so that compartment air can be recirculated through the heating and cooling units, and inlet 17 communicates with the atmosphere for supplying fresh air into the duct system. A damper or door 33 is arranged to be alternatively swung from the full line position to the dotted line position by a vacuum motor 34 to control the source of air to be passed through the duct system. Vacuum motor 34 is like motor 30 and suffice to say, it comprises a push rod 35 connected to the damper 33, and when the interior of the motor chamber is connected to a vacuum source by way of a suitable conduit 36 the atmospheric pressure moves the diaphragm and the push rod to position the damper as shown in dotted lines.

Blower 19 is driven at various appropriate speeds by an electric motor 37 which is connected in a power circuit including wire 40 which leads to a speed control switching means described more fully hereinafter.

Cooling unit 21 comprises an evaporator of a conventional compressor-condenser-expander type air conditioning system for automotive vehicles and includes a compressor 41 which discharges compressed refrigerant into a condenser 42 which empties liquified refrigerant into a receiver tank 43 connected by a conduit 44 to the intake of the cooling unit 21. An expansion valve 45, or other suitable pressure reducing device, is provided for metering the liquid into the cooling unit and expanded refrigerant is withdrawn from the cooling unit and returned to the low pressure side of the compressor through a conduit 46, all of which is well known in the art.

The compressor 41 is driven by a water cooled type of internal combustion engine E of the automobile through a drive including an electro-magnetically operated clutch 50 which is controlled by a suitable thermostatic switch (not shown) so as to initiate operation of the compressor whenever the atmospheric temperature is 40° F. or above. This form of drive and control for refrigerant compressors is well known.

Heating unit 22 is a conventional hot water heater core having a copper tube in serpentine form with fins secured thereto so that heat from water or other engine coolant passing through the tube is readily transferred to air passing the fins and tubes. The hot liquid from the cooling system of the engine is fed to the heater unit from the cooling jacket of the engine through a conduit 51 which leads to the inlet of the unit, and the outlet of the unit is connected by a conduit 52 to the inlet of a flow regulator valve 53, the outlet of which valve is connected by a conduit 54 to the liquid cooling radiator for the engine (not shown). This type of heater and control valve are well known.

Figure 2:
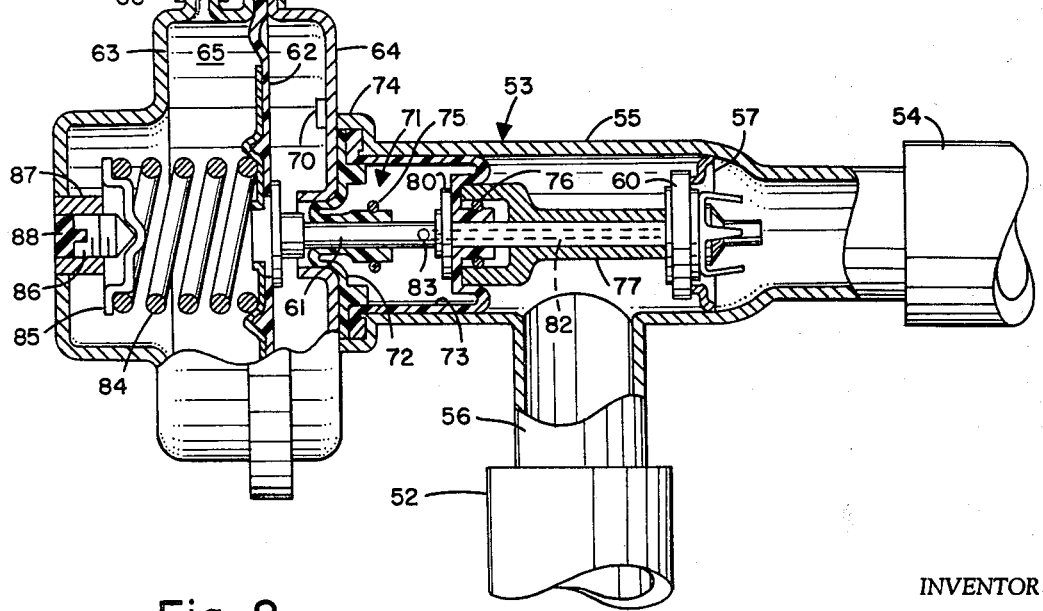
FIG. 2 is a sectional view of a vacuum operated valve forming part of the system of FIG. 1.
Figure 3:
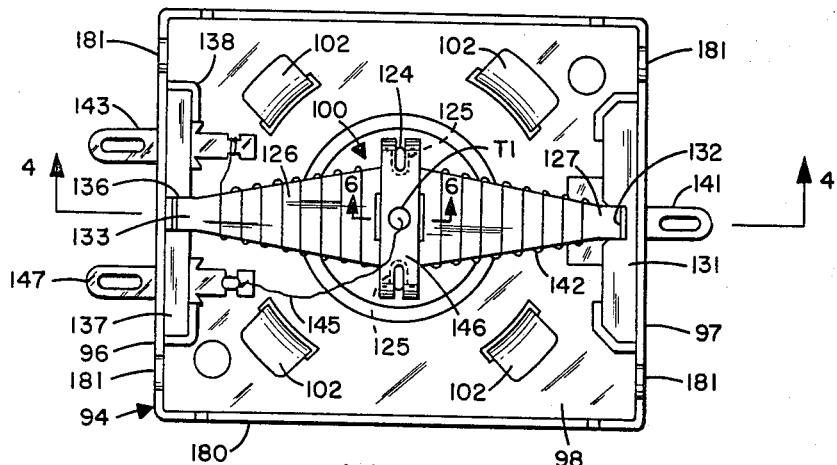
FIG. 3 is a plan view of a vacuum regulator, certain parts thereof being shown removed, used in the system of FIG. 1.

Valve 53 is shown in detail in FIG. 2 and comprises a main tubular body 55 having a tube 56 attached thereto and forming an inlet to the valve. An annular valve seat 57 is brazed inside body 55 to form a valve seat on which a disc valve 60 closes. Disc 60 is attached to a rod 61 which is connected to and actuated longitudinally by a flexible diaphragm 62 which has its rim crimped between two cup shaped members 63 and 64 to form a chamber 65 which is sealed to atmosphere and has an outlet connection 66 connected by a tube 67 to a source of vacuum described more fully hereinafter. Tubular member 55 is attached to cup member by tabs 70, only one of which appears in the drawings, projecting through openings in the cup and turned against the cup wall, and the end of the tubular member is sealed by a flexible diaphragm assembly 71 through which rod 61 extends.

Assembly 71 comprises a circular flexible end member 72 and a flexible cup shape member 73 having end flanges abutting one another and crimped into sealing engagement between an end flange 74 of tubular member 55 and cup 64 to form a hermetic seal between these parts. The members 72 and 73 have aligned neck portions through which the valve rod 61 extends, the neck portions being sealingly secured to the rod by wires 75, 76. A spacer 77 surrounds rod 61 and has an annular end which tightly presses the end wall of the cup to a disc 80 attached to the rod, the opposite end of the spacer abutting valve member. Rod 61 has an axial bore 82 therein extending from the downstream end to an opening 83 within the area between members 72 and 73 so that the effects of the pressure inside the engine cooling system will not materially affect operation of the valve, as is described in U.S. Patent No. 3,018,084.

A compression spring 84 inside chamber 65 loads diaphragm 62 in a direction to close valve disc 60 on seat 57. One end of compression spring 84 abuts a washer 85 and is adjusted by a screw 86 threaded in a bushing 87 brazed into an opening through the outer wall of member 63. Preferably, a suitable sealing material 88 is molded in over the head of adjusting screw 86 after factory setting thereof. By the construction shown, valve disc 60 will be moved from its seat 57 by subjecting the chamber 65 to a vacuum, the degree of valve opening depending upon the force of spring 84 on diaphragm 62 and likewise the degree of vacuum, and consequently the volume of flow of heating fluid through the heating unit 22 will depend upon the amount of vacuum in the chamber. Thus, the higher the vacuum, i.e. the lower the mercury reading, the higher will be the heat input to the heater unit 22.

The vacuum sources for operating motors 30, 34 and valve 53 are provided from a control box 90 which is connected in turn to the intake manifold M of engine E through a conduit 91, one end of which is attached to the intake manifold M and the opposite end of which is connected with a "raw vacuum" connector 92 of the control box. As is explained in detail hereinafter, box 90 has control devices therein which respond to temperature sensing elements located in various parts of the compartment and air tempering system, and the vacuums applied to the valve 53 and motors 30 and 34 respectively are controlled according to the sensed temperatures to provide for the discharge of dehumidified air into the passenger compartment at temperatures which closely maintain a preselected average temperature in the compartment without uncomfortable variations in the temperature of the air discharged into the compartment.

Control box 90 may be formed of any suitable material, such as sheet metal, and it encloses various components of the control system. The control box may be positioned in any convenient location in the automobile, such as under the instrument panel P or beneath the engine hood (not shown), so that the vacuum and electrical outlets can be conveniently connected to the various vacuum motors and blower motor. Thus, installations of the control equipment in an automobile is relatively simple.

Referring to FIG. 7, box 90 is shown with one side removed, and it includes an L-shaped bracket 93 which cooperates with the outer walls of the box to form a compartment for a transducer 94. Transducer 94 is operative to provide a vacuum source which varies according to certain temperature conditions for operating valve 53 and an electric control switch 95, described more fully hereinafter.

Referring to FIGS. 3 to 6, the transducer 94 comprises a box-like sheet metal housing comprised of a U-shaped member forming two end walls 96, 97 interconnected by a side or bottom wall 98. A vacuum regulator 100 is supported on wall 98 by a collar 101 surrounding a flange on the regulator body and which is attached to the wall by tabs 102 projecting through openings in the wall and turned to retain the collar to the wall.

Vacuum regulator 100 comprises a shallow cup-shaped member 103 which may be molded plastic, having a central exhaust or raw vacuum inlet stem 104 and a regulated vacuum outlet stem 105. Stem 104 forms a connector for receiving an end of a conduit 106 leading to a branch connector 92 to which conduit 91 from the engine intake manifold is attached, as seen in FIG. 7. The upper end of stem 104 is reduced in diameter and forms a valve seat 107 projecting well beyond the bottom wall of member 100 and which seat is closed by valve means described hereinafter to provide a regulated vacuum in chamber 108. Stem 105 forms an outlet connector for a regulated vacuum conduit 110 attached to one branch of a connector 111 secured in a wall of the box 90 and to which conduit 67, leading to valve 53 is connected.

A thin rubber-like diaphragm 112 is positioned across the top of chamber 108 and has openings 113 forming a strip 114 extending over the seat 107 to form a valve closure thereof. A rigid button-like member 115 is nested in a recess in the diaphragm and has two abutments 116 and 117 which project through the openings 113 and have holes in the outer sides which receive the inturned ends of a wire bail 120 which positions the diaphragm 112 and member 115 relative to valve seat 107 as is described more fully hereinafter. The member 115 has a central opening therethrough into which the upper end of stem 104 extends so that valve seat 107 may be closed by the strip portion 114 of diaphragm 112 when the member 115 is lowered about the stem.

Diaphragm 112 has turned edges 121 which nest in an annular groove 122 in member 103 and the edges are pressed into the groove by the force of collar 101 holding member 103 to the wall 98. Thus, the interior 108 of member 103 is sealed from the atmosphere except for openings which occur by separation of strip 114 from member 115 as is described more fully hereinafter.

Figure 4:
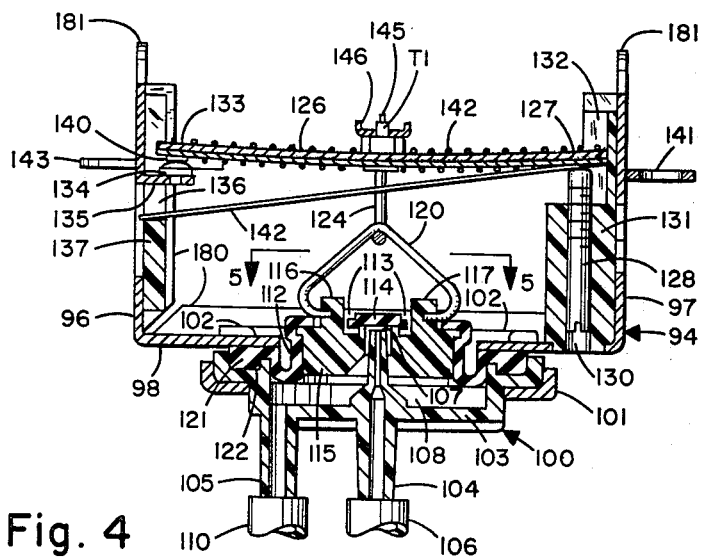
FIG. 4 is a sectional view of the regulator taken along line 4—4 of FIG. 3.
Figure 5:
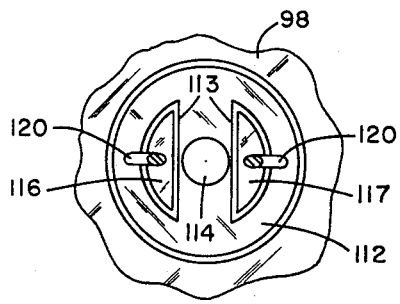
FIG. 5 is a fragmentary plan view of the vacuum regulator taken substantially along line 5—5 of FIG. 4.

When inlet 104 is connected to the engine intake manifold through tube 106, and the engine is operating, the pressure in chamber 108 tends to assume that of the vacuum source, i.e., the intake manifold pressure, and atmospheric pressure tends to urge diaphragm 112 inwardly of the chamber, causing strip 114 to close valve seat 107 which prevents the strip from following movement of member 115 downwardly, as viewed in FIG. 4, whereby atmospheric air then passes between the confronting surfaces of the strip and member 115 and into the chamber which quickly restores the interior of the chamber to a pressure at which valve seat 107 is reopened to connect the chamber with the vacuum source. By applying a force tending to hold diaphragm 112 from entering the chamber 108, the degree of vacuum which will be present in the chamber 108 before the valve seat 107 is closed can be regulated and bail 120 applies such force as is described hereinafter. Outlet 105 is connected by a conduit 110 with the branch connector 111 and the vacuum in this connector corresponds to that maintained in chamber 108.

Bail 120 is supported by a wire stirrup 124 which has its ends reversed and which ends rest on side tabs 125 formed on a bimetal strip 126, which tabs are notched to receive the wire ends and retain the wire in engagement with the bimetal. Normally, the bimetal 126 tends to be straight and offers resistance to the bail 120 moving to cause the strip 114 to close on port 107. As the bimetal tends to bow downwardly, which occurs upon heating thereof, a lower vacuum will cause the strip 114 of the diaphragm 112 to move inwardly and close off the vacuum source at seat 107, and consequently lower vacuum will prevail in chamber 108 as the bimetal is heated to a higher degree. As mentioned hereinbefore, this will result in valve 53 tending to close and prevent the flow of liquid to heater unit 22.

One end 127 of bimetal 126 rests on a screw 128 threaded in an opening 130 in an insulating block 131, and the bimetal is held aligned with the screw by the sides of a groove 132 in the insulating block into which the end of the bimetal rests. The opposite end 133 of bimetal 126 normally rests on a fixed contact 134 which is secured to an inturned lug 135 formed on end wall 96 and extending through a slot 136 formed in an insulating board 137 secured to the inside of end wall 96 by lugs 138 projecting from the wall and embracing notched portions of opposite sides of the board. End 133 of bimetal 126 carries a contact 140 which normally engages the fixed contact 134 to complete a circuit from the bimetal to the housing 94 which is grounded by way of a terminal tab 141 and which circuit is described more fully hereinafter.

One end of a light force flat cantilever spring 142 is welded to the end 127 of the bimetal and the opposite end of the spring rests in the closed end of slot 136 and exerts sufficient force to tilt the bimetal and raise it from contact 134 when the central portion of the bimetal bows towards regulator 100 sufficiently to relieve pressure between bail 120 and wire 124 by reason of the action of the diaphragm 112 closing on valve seat 107.

Bimetal 126 is heated by an electric resistance wire 142 which is wrapped thereabout and electrically insulated therefrom by a suitable insulation material. One end of heater wire 142 is connected with a terminal 143 secured in an opening through the insulator 137, and the opposite end is welded to the end 127 of the bimetal whereby the circuit through the heater includes the normally closed contacts 134, 140, the bimetal being electrically insulated from all other parts. As mentioned previously, the heater circuit will be broken at contacts 134, 140 when the bimetal has been heated sufficiently to cause the valve strip 114 to remain closed on valve port 107.

It will be understood that as the temperature of the bimetal 126 increases it tends to curve downwardly to reduce the pressure required to close strip 114 in port 107 and therefore the vacuum in chamber 108 decreases, or approaches atmospheric, and as the temperature of the bimetal decreases, the bimetal tends to straighten and cause an increase in the vacuum in chamber 108.

A thermistor T1 is maintained in close heat transfer contact with the bimetal 126 by an inverted cup shaped insulator cap 144 which receives and surrounds the thermistor except for that side engaging the surface of the bimetal 126, and the insulator has a neck portion through which the lead 145 for the thermistor extends and which neck projects through an opening in a spring clip 146 which holds the thermistor and its cap in place. The clip 146 has a bridge portion with a central opening receiving the neck of the thermistor cap therethrough and the ends of the clip are slotted to receive the bail 124 and are folded over the tabs 125 of the bimetal for resiliently embracing the latter and urging the thermistor into engagement with the surface of the bimetal. The terminal lead 145 of the thermistor T1 is connected to a terminal 147 suitably secured in insulator board 137.

As mentioned previously, the vacuum regulator 100 of transducer 94 operates the switch means 95 which comprises a conventional vacuum motor including a cylinder 148 having a flexible diaphragm therein arranged to shift a connecting rod 148a attached to a rotary switch member 149. A spring (not shown) urges the diaphragm in a direction to extend the connecting rod from the cylinder and rotate member 149 counterclockwise when the vacuum decreases in the cylinder and is overcome by atmospheric pressure which is operative to rotate the member clockwise when the vacuum increases. A conduit 148b interconnects the cylinder 148 with the vacuum manifold or connector 111.

The switch means 95 controls the operation of fan motor 37 by speed control circuits, including suitable resistances, connected with the positive terminal of the battery B of the automobile by a conductor 149a and with a conductor 40 leading to the motor. When the vacuum is high, as a result of a call for heat, motor 37 will operate at maximum speed and decreasing vacuum causes the switch member 149 to be rotated to switch in additional resistances in the motor circuit, to lower the speed of the fan. When the vacuum is at an intermediate value, the fan motor speed will be at a minimum. By this action, heating air is supplied to the compartmnt at a rate commensurate with the requirement therefor. Continued decrease in vacuum will increase the speed of motor 37 and its speed will be increased as the vacuum decreases to approximately atmospheric pressure, at which time the fan will operate at full speed. This action provides for distribution of cooling air into the compartment at a rate commensurate with cooling requirements. The details of the switching means and the speed control for the motor 37 are not shown because such means are well known in the art.

In addition to controlling the fan motor 37, switch 95 also controls a pair of conventional solenoid operated three-way valves 150, 151 which are suitably attached in the housing 90 and each of which comprises an outlet port connection 152, 153, respectively, which are connected to a manifold 154 which is connected to one branch of the connector 92 so that the outlet ports are connected to the source of "raw vacuum" at the engine intake manifold M through conduit 91. Valve 150 has a port connection 155 to which the conduit 36 is connected, and valve 151 has a port connection 156 to which conduit 32 is connected. Each valve 150, 151 has a solenoid 157, 158 respectively, which when energized operates the respective valves to connect the port connections 152 with 155, and 153 with 156 and thereby subject the damper motors 30, 34 to a low pressure and cause the dampers 26, 33 to be shifted to their dotted line positions. When the solenoids are de-energized, the respective connections 155, 156 are vented to atmosphere and the connections 152, 153 are closed. Valves of the type mentioned are well known in the art and their details need not be shown for an understanding of the invention. The circuit for solenoid 157 includes switch means 95, wire 160 to ground, and the circuit for solenoid 158 includes switching means 95, wire 161 to ground.

As mentioned hereinbefore, the vacuum produced at the transducer 94 for operating the valve 53 and the switch mechanism 95 is dependent upon the temperature of the bimetal 126 and this temperature is in turn controlled, above atmospheric temperatures, by the resistance heater 142. The circuit for controlling the resistance heater 142 includes temperature sensing thermistors T2, T3 which are located in the outside air inlet duct 17, to be responsive to atmospheric or ambient air temperature, thermistors T4 and T6, located in the duct section 23, so as to be responsive to temperature of air discharging into the compartment from the exchanger 22, and a third thermistor T5 located in the passenger compartment so as to be responsive to the average air temperature of the compartment.

The temperatures desired to be maintained in the passenger compartment are regulated by the adjusting knob K, which is supported in a suitable frame attached to the instrument panel P of the automobile and which knob is operable to vary the resistance of a variable resistance R1.

Figure 8:
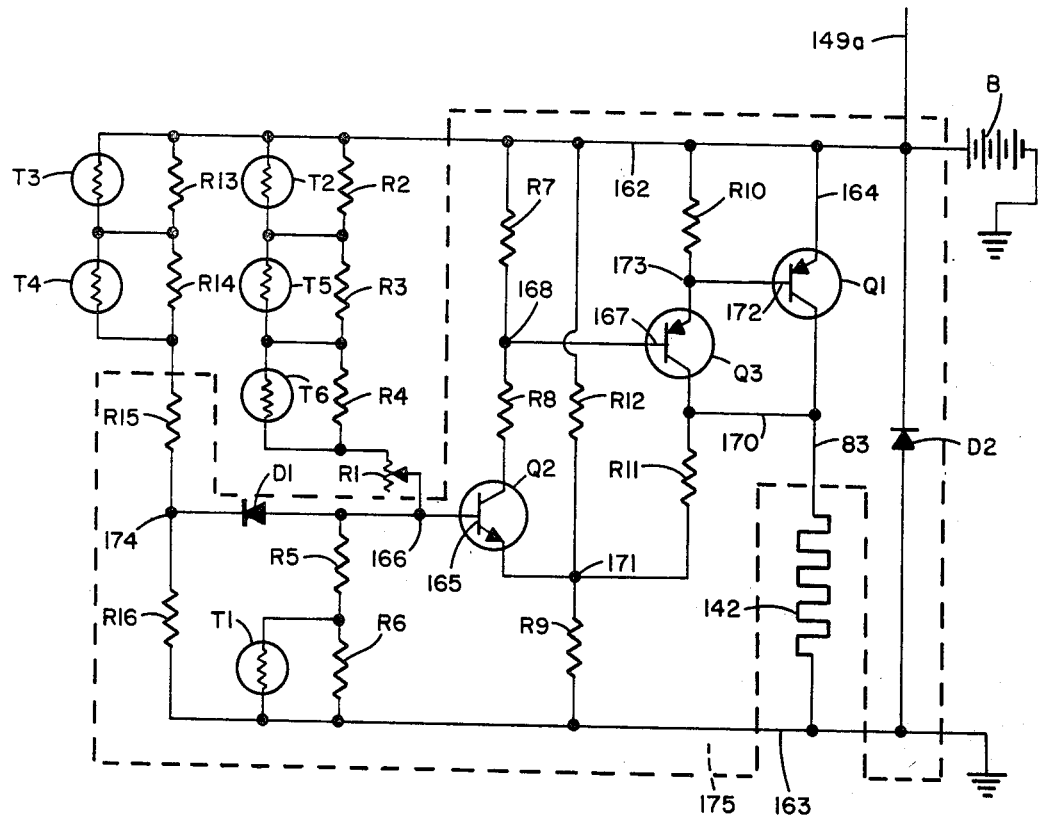
FIG. 8 is a wiring diagram of the control circuits of the control system embodying the invention.
Figure 6:
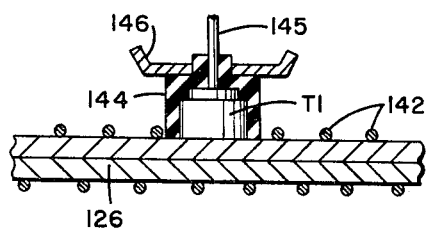
FIG. 6 is a fragmentary sectional view taken along line 6—6 of FIG. 3 and on a larger scale.

Referring more particularly to FIG. 8, the current for the control circuit is supplied by the 12 v. automobile battery B having a conductor 162 connected with the positive terminal thereof and the ground side of the circuit includes a grounded conductor 163. The resistor heater 142 for bimetal 126 is connected between conductors 162, 163 by a circuit including the collector of a PNP transistor Q1, the emitter of the transistor being connected to conductor 162 by a conductor 164.

The transistor Q1 is connected in a Darlington amplifier circuit described hereinafter, and which is driven by an NPN transistor Q2 having its base 165 connected with a junction 166 of a first voltage divider circuit.

The first voltage divider circuit comprises resistors R2, R3, R4, R1, R5, R6 connected in series between power supply conductor 162 and ground 163. The thermistor T1 is connected in parallel with the resistor R6 while the thermistors T2, T5 and T6 are connected in parallel with resistors R2, R3, R4, respectively, to provide at the junction 166 between resistors R1 and R5 a voltage signal which varies in accordance with temperature changes at the thermistors T2, T5, T6 and T1 and with the setting of variable resistor R1. Because the thermistors have a negative co-efficient of resistance, that is to say, their resistance decreases as the temperature thereof increases, the voltage at junction 166 will decrease and increase with decreases and increases, respectively, of the temperatures sensed by thermistors T2, T5, T6.

Of course, increases and decreases in resistance of variable resistor R1 will result in corresponding decreases and increases in voltage at the junction 166. This voltage is utilized as a control for biasing the transistor Q2 which has its base connection 165 connected to the junction 166 to derive base current therefrom.

The collector of transistor Q2 is connected to conductor 162 through resistors R7, R8 and the emitter thereof is connected to the ground 163 through a resistor R9. The base 167 of a PNP transistor Q3 is connected to the junction 168 between resistors R7, R8 and the emitter thereof is connected to conductor 162 through a resistor R10. The collector of Q3 is connected to ground 163 through conductors 170, 83 and the resistance 142, and also by way of resistors R11 and R9. A resistor R12 of equal valve to resistor R9 is connected between conductor 162 and junction 171 so that the bias on the emitter of transistor Q2 at junction 171 is one-half the voltage supply. The base 172 of transistor Q1 is connected to the junction 173.

The present invention contemplates means for limiting the discharge air temperature at the lower end of the scale so that cool air will not be discharged into the compartment by setting the temperature selector K to a cool position on a relatively cold day. This is accomplished by providing a second voltage divider network comprising resistors R13, R14, R15 and R16 connected in series between the power supply conductor 162 and ground 163.

The thermistors T3 and T4 are connected in parallel with the resistors R13, R14, respectively. The junction 174 between resistors R15 and R16 is connected with junction 166 through a rectifier diode D1. The diode D1, referred to as a steering diode, serves to isolate the voltage divider network including thermistors T2, T5, T6 and T1 from the voltage divider network including thermistors T3 and T4 when the voltage at junction 174 is greater than the voltage at junction 166.

However, when the voltage at junction 174 falls below the voltage at junction 166 the voltage at 174 will be applied to the base connection 165 of the transistor Q2 so that the thermistors T3, T4 take over control of the system from the thermistors T2, T5, T6. When the voltage at junction 174 exceeds the voltage at junction 166 control of the circuit is restored to the thermistors T2, T5, T6.

A diode D2 is connected in the circuit between conductor 162 and ground 163 to absorb inductive currents and thereby protects the semi-conductors of the control system.

The transistors Q1, Q2, Q3, resistors R5, R6, R7, R8, R9, R10, R11, R12, R15, R16, and diodes D1, D2 are mounted on a suitable insulating board 175 which is supported on wing members 176 at opposite ends of a saddle shaped housing member 177 having a top wall 178 and opposite side walls, one of which is shown at 179, which extend downwardly and nest within inturned flanges 180 formed on the ends 96, 97 and bottom wall 98 of the housing for transducer 94. Four tabs, two of which appear at 181, extend from the top edges of the ends 96, 97 through openings in wall 178 and are crimped over to secure the saddle shaped bracket to the bottom portion of the housing. The circuit board 175 includes depending conductors 182, 183 which are soldered to the terminals 147, 141, respectively, to provide circuit connections for the thermistor T1 and ground, and a depending conductor, not shown, parallel to conductor 182 is soldered to terminal 143 to provide electrical connection for the resistance heater 142. An inverted channel shaped cover 184 overlies the transistors and resistances supported on board 175 and is located in place by four lugs 185, only two of which appear in the drawings, which engage in notches opposite side edges of the board.

The board 175 includes three terminal connections 186 for connecting the thermistors in circuit and for connecting the circuit to the source of power.

A suitable on-off switch, not shown, is provided which is operated by the knob K to open the conductor 162 when the system is to be inoperative.

Assuming that the knob K is set to provide a temperature of 75° F. at the thermistor T5, which is representative of the average temperature of the compartment, and the outside air is considerably above 75° F., the circuit to the conductor 162 is closed by the on-off switch. The resistance of the first bridge including T5, T2, T6 and R1 will be relatively low and the voltage at junction 166 will be higher than that of the emitter of Q2. This tends to bias the transistor on which results in a relatively large flow of current from conductor 162, through R7, R8, transistor Q2, resistor R9 to ground 163, causing current flow from conductor 162, through R10, base 167 of Q3 to junction 168 which negatively biases Q3 triggering a relatively heavy current flow through the collector of transistor Q3 through conductors 170, 83 and heating resistor 142 to ground. Some current flows through resistor R11, junction 171, R9 to ground, which provides a stabilizing potential for transistor Q2 at 171. The flow of current through transistor Q3 produces a negative bias at junction 173 intermediate resistor R10 and the emitter of transistor Q3, thereby negatively biasing the base 172 of transistor Q1 which causes a relatively high current flow from conductor 162, through conductor 164 transistor Q1, conductor 83 to resistance 142 to ground. It will be seen therefore, that current flow through Q1 is proportional to the degree of potential at the junction 166 relative to the emitter side of transistor Q2 and is of considerable higher value or amplification thereof.

The current flow through the heater 142 causes the bimetal 126 to tend to bow and to reduce the force restraining strip 114 from closing on port 107 which reduces the vacuum in chamber 108. This reduced vacuum condition results in closure of valve 53 so that the heating unit 22 receives no heating fluid. As indicated previously, when the outside temperature reaches 40° F., for example, the compressor 41 will be operated by the engagement of the thermostatically controlled clutch 50 and the cooling unit 21 will be effective to cool the air prior to its passage to the heater 22. Suitable control means, not shown, but well known in the art, limits the low temperature of the cooling unit.

The switch means 95 is likewise operated by the reduced vacuum so that the speed of the fan motor is that appropriate to the variation in compartment temperature above 75° F.

Should the temperature of the incoming untempered air increase, the thermistors T2, T3 will further increase in temperature, thereby lowering the resistance of the bridge circuit in which they are positioned thereby increasing the voltage at junction 166. This increases the current flow through heater 142 causing the bimetal 126 to further reduce the vacuum in chamber 108. This increases the speed of the blower motor 37 to thereby increase the rate of discharge of cooling air into the compartment.

As the air temperature of the compartment tends to decrease from that of the setting of knob K, the control circuit will be effective to control the valve 53 to reheat the air cooled by the unit 21 to maintain a temperature in the compartment according to the setting of the knob.

The heating of thermistor T1 corresponding to the heating of bimetal 126 reduces the resistance through the circuit between junction 166 and ground 163 so that the voltage at 166 is correspondingly reduced to prevent wide variation in the heating of the bimetal.

Should the knob K be set to a lower temperature setting, the resistance in the circuit between 162 and 166 will be decreased, causing a result similar to that described by an increase in temperature of the compartment air or incoming air.

In the event the air temperature outside the compartment decreases below the setting of knob K, the resistances of T2, T5, T6, when affected thereby, respond by an increase in resistance therethrough resulting in a lowering of the voltage at 166, thereby effecting a decrease in the current supplied through Q1 to the heater 142. This reduction in temperature of the heater and the bimetal 126, results in an increase in the vacuum in the chamber 108 and valve 53 opens to cause heating fluid to pass through unit 22 and warm the air entering the compartment.

As the air temperature flowing into the compartment through duct 23 increases, the resistance of T6 decreases, thereby tending to reduce the resistance of the first bridge circuit between the conductor 162 and the junction 166 and increase the voltage at the junction thereby causing an increase in the current drawn by bimetal heater 142 through Q1 so that the vacuum is reduced in chamber 108 and at chamber 62 of the valve 53, resulting in a corresponding decrease in flow of the heating fluid through the heat exchanger 22. Thus, overheating of the air discharged into the compartment is prevented.

On the other hand, should the temperature of the air entering duct system 15 decrease, the resistances of the thermistors T2, T6 increase so that the voltage at junction 166 will be decreased and thereby control the amplifier to maintain the proper vacuum at valve 53 and provide sufficient heat to maintain the desired temperature in the compartment.

It will be appreciated from the foregoing that the temperatures sensed by the various thermistors will control the biasing voltage at 166 so as to maintain an even temperature in the compartment although temperature fluctuations may occur or tend to occur at various points in the tempering system and the air entering from the exterior of the automobile compartment.

Should knob K be set to maintain a lower temperature, i.e. set to decrease the resistance of the bridge circuit in which it is located, the positive bias at 166 would be increased and cause a material increase in the flow of current to the risistor 142 and a corresponding reduction in the degree of vacuum in chamber 65 of valve 53 and a closing of the valve 53. This would result in a discharge of cool air into the compartment; however, a reduction in air temperature discharged from unit 22 will increase the resistance of T4 so that the voltage at junction 174 could be less than that at junction 166 and result in a decrease in current flow through resistor 142; consequently valve 53 will be maintained open to prevent undercooling of the discharge air.

While the thermistor T6 will have some effect in preventing an uncomfortable drop in discharge air temperature, the second bridge circuit, which includes T3, T4 and D1, will take over to prevent sudden reductions in discharge air temperature in the manner described hereinbefore.

As the temperature of the ambient air increases and the temperature of thermistor T5 increases, the resistance of the circuit is reduced and the voltage at junction 166 increases resulting in the vacuum applied to the valve chamber 65 being correspondingly reduced so that less heat will be given off by the heater core 22.

When the ambient temperature exceeds that of the setting of knob K, the voltage at junction 166 will be increased so that the heating of bimetal 126 will be increased and therefore the vacuum produced at chamber 108 of the transducer will be of a lower degree resulting in a closure of valve 53.

As the ambient temperature increases still further, the thermistor T5 tends to become warmer and decreases in resistance resulting in a high voltage at 166 and a further decrease in the vacuum in chamber 108 of the transducer. This reduction in value of the vacuum results in motor 148 actuating switch means 95 to increase the speed of blower motor 37 and force air over the cooling unit 21 at a higher rate.

The rate of fan motor 37 is controlled by the switch means so that when a high degre of heat is required in the compartment or large capacity cooling is required, the fan motor operates at maximum speed and when a reduction in heating or cooling is sufficient to maintain the temperature desired in the compartment the speed of the fan is reduced.

Likewise, when the temperature range is such as to require cooling rather than heating, the resulting vacuum in the motor switch cylinder 148 will actuate the switch means 95 to cause solenoid valve 151 to be energized and actuate motor 30 to shift the vane 26 from the full line to the dotted line position and cause the air to be discharged into the compartment through the outlet duct 25. Similarly, the vane is shifted to the full line position when the vacuum in motor 148 increases in degree.

The switching means 95 controls solenoid valve 150 to move the vane 33 from full line position to dotted line position when extreme cooling capacities are required, and at intermediate requirements the vane is in the full line position.

The values of the various components of the circuit described are as follows; however, deviations could be made without departing from the scope of the invention.

T1=1444Ω @ 78° C., 3.60%/° C.
T2=412Ω @ 25° C., 4.46%/° C.
T3=2360Ω @ 25° C., 4.84%/° C.
T4=2360Ω @ 25° C., 4.84%/° C.
T5=412Ω @ 25° C., 4.46%/° C.
T6=1630Ω @ 15° C., 4.9%/° C.
R1=1K.
R2=1.2K.
R3=6.8K.
R4=430
R5=approx. 2.6K. (for calibration)
R6=1.2K.
R7=1.2K.
R8=3.3K.
R9=330
R10=68
R11=15K.
R12=330
R13=2.2K.
R14=2.2K.
R15=6.8K.
R16=8.2K.
Resistor 142=32Ω
Q1=2N301
Q2=2N1302
Q3=2N322
D1=1N456A
D2=1N456A From the foregoing detailed description, it will be recognized that there has been provided an improved automotive tempering system and control circuitry therefor which fulfills the previously stated objects and advantages as well as others apparent from the description. It will also be recognized that certain modifications and substitutions may be made by those skilled in the art to which the invention pertains without departing from the spirit of the invention. Accordingly, although the invention has been described in considerable detail with reference to specific tempering systems embodying the invention, it will be understood that the invention is not limited thereto, but rather the invention includes all those modifications, adaptations, substitutions and uses as are reasonably embraced by the scope of the claims hereof.

Having described my invention, I claim:

1. In a system for controlling the temperature in a space into which tempered air is discharged from an air tempering means, control means for regulating the temperature of the air discharged from said tempering means comprising, an electrical current responsive element, means to energize said element comprising circuit means including a first voltage divider circuit having a plurality of resistances therein, a junction intermediate said resistances, one of said resistances being adapted to appreciably vary its electrical resistance according to changes in temperature in the space, electric current amplifying means connected with said junction and responsive to voltage changes at said junction to control a flow of current through said current responsive element, a second voltage divider circuit parallel with said first divider circuit and including a plurality of resistances one of which is adapted to appreciably change its electrical resistance in accordance with changes in temperature of air discharging into said space from said tempering means, and means interconnecting said second voltage divider circuit with said junction comprising a rectifier connected with said junction and at a point intermediate the last mentioned one resistance and another resistance of said second circuit.

2. In a system for controlling the temperature in a space into which tempered air is discharged from an air tempering means, control means for regulating the temperature of the air discarged from said tempering means comprising, a thermally responsive actuating element operable in response to electric current flow, circuit means for controlling flow of current to said element in response to sensed air temperature, said circuit means including a signal circuit having a plurality of impedance producing elements therein for providing a signal at a point in said circuit, and means responsive to the temperature of said element to proportionately modify the operation of said circuit means.

3. In a system for controlling the temperature in a space into which tempered air is discharged from an air tempering means, control means for regulating the temperature of the air discharged from said tempering means comprising, an electric current thermally responsive element, circuit means for controlling flow of current through said element in response to temperature in said space, said circuit means including a voltage divider circuit having a plurality of resistances therein and a junction intermediate said resistances, and means responsive to the temperature of said element to proportionately modify the operation of said circuit means, one of said resistances comprising a resistance element the resistance of which changes according to temperature changes and which is disposed in heat exchange relation with said thermally responsive element.

4. A tempering system for automotive vehicle passenger compartments or the like, said system comprising; tempering means for heating and cooling air for a compartment, including a duct for introducing air to said means, electric signal responsive means for controlling said tempering means in response to an electric signal in a signal circuit thereof, means providing a first electric signal to said signal circuit as a function of compartment temperature and a desired temperature, means providing a second electric signal to said signal circuit as a function of temperature of air discharged from said tempering means, and means for rendering effective only one of said signals in accordance with a predetermined relation therebetween.

5. A tempering system for automobile passenger compartments and the like, said system comprising; tempering means for heating and cooling air to be introduced into a compartment, first condition responsive means providing a first signal voltage as a function of compartment temperature and a desired temperature, second condition responsive means providing a second signal voltage as a function of outside air temperature and the temperature of air to be introduced into said compartment, control means for said tempering means connected directly to said one of said condition responsive means and connected to the other of said condition responsive means through steering means whereby said control means is responsive only to the higher of said signal voltages for controlling said tempering means.

6. A tempering system for automobile passenger compartments and the like as set forth in claim 5 characterized by said steering means comprising a diode.

7. In a valve for regulating the pressure in a chamber having an outlet port adapted to be connected with a source of vacuum, a movable valve member adapted to close in said port, means to control movement of said valve member including a bimetal strip, an electrically energized heating element in heat exchange relation with said strip, means for supporting said bimetal relative to said valve member, means interconnecting said bimetal strip and said valve member, and means for controlling energization of said heating element including a thermistor secured in heat exchange relation to said bimetal.

8. A tempering system as defined in claim 5 wherein said control means includes a valve for regulating the pressure in a chamber having an outlet port adapted to be connected with a source of vacuum, said valve including a movable valve member adapted to close said port, means to control movement of said valve member including a bimetal strip connected to the valve member and an electrically energized heating element in heat exchange relationship with said bimetal strip, said control means further including electrical circuitry operative to energize said heating element to deflect said bimetal strip and effect movement of said valve member in response to a signal of one of said condition responsive means.

9. A tempering system as defined in claim 8 and further including a thermistor secured in heat exchange relationship to said bimetal and electrically connected to said circuitry to control energization of said heating element in response to the temperature of said bimetal strip.

References Cited

UNITED STATES PATENTS

| | | | |
|---|---|---|---|
| 2,302,320 | 11/1942 | Hintze | 62—230 XR |
| 2,375,988 | 5/1945 | Gille | 62—186 XR |
| 2,474,441 | 6/1949 | Sparrow | 62—186 XR |
| 2,500,775 | 3/1950 | Stewart | 165—16 |
| 3,164,365 | 1/1965 | White. | |
| 3,346,231 | 10/1967 | Wall | 251—11 |

MEYER PERLIN, *Primary Examiner.*